Nov. 7, 1950     E. C. HEDGES     2,529,391
BOLT MECHANISM FOR MACHINE GUNS
Filed Jan. 31, 1946
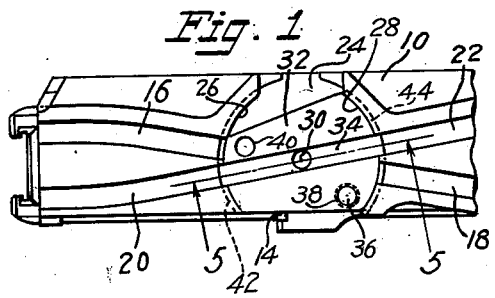
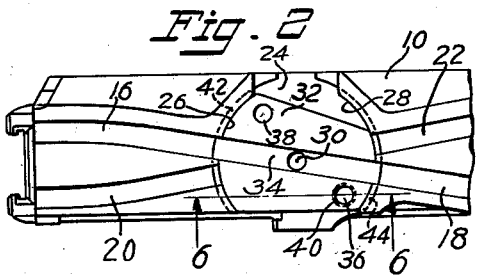
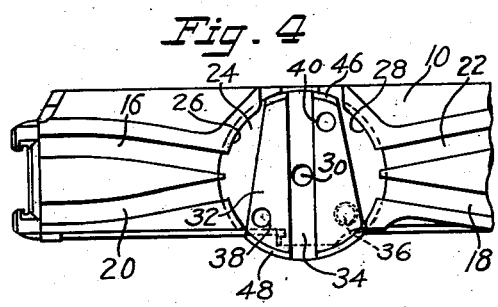
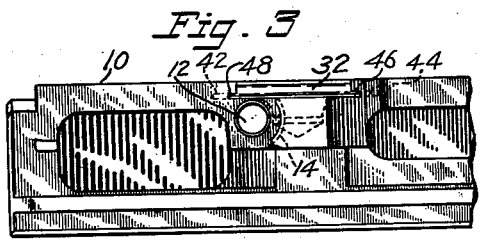
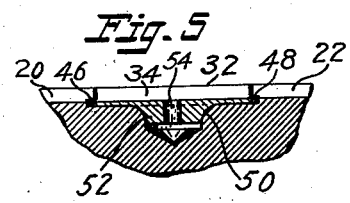
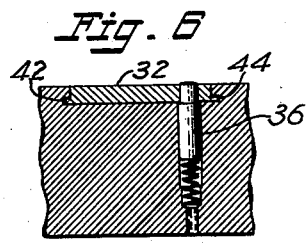
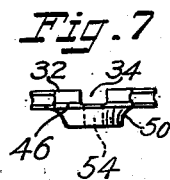
Inventor
Ellsworth C. Hedges, Deceased
By his administrator
E. Warren Hedges
By [signature] Attorney Patented Nov. 7, 1950

2,529,391

UNITED STATES PATENT OFFICE 2,529,391

BOLT MECHANISM FOR MACHINE GUNS

Ellsworth C. Hedges, deceased, late of West Hartford, Conn., by E. Warren Hedges, administrator, Manchester, Conn., assignor to Colt's Manufacturing Company, a corporation of Connecticut Application January 31, 1946, Serial No. 644,502

5 Claims. (Cl. 89—33)

The invention relates to a bolt mechanism for an automatic firearm or machine gun of the Browning type and relates more particularly to a bolt mechanism having the general characteristics of those disclosed in Reissue Patent No. 19,159 to F. T. Moore et al., dated May 8, 1934, and in Patent No. 1,936,254 to F. T. Moore, dated November 21, 1933. As disclosed in the said patents, the longitudinally movable breech bolt is provided at the top with pairs of grooves forming incomplete parts of two oppositely inclined intersecting cam paths, and is provided at the intersection of the cam paths with a recess in which is mounted an angularly movable cam block or "switch." The cam block has a groove therein which is adapted to register with the grooves of either pair in the top of the bolt to complete either of the said cam paths. As shown in the said Patent No. 1,936,254, the angularly movable cam block is provided with a downward extending stem or pintle which fits a bearing aperture in the block and the said stem or pintle is provided with a circumferential groove into which projects the pivot stud of the extractor, the said pivot stud thus serving to hold the cam block in place and to prevent upward movement thereof without interfering with angular movement.

The construction shown in the said Patent No. 1,936,254 has been very extensively used and has been found to be satisfactory, but it requires very close accuracy of machining not only in the formation of the groove in the stem of the block but also in the size of the extractor stud and its bearing aperture and in the location of the stud bearing aperture with relation to the aperture for the stem of the block. Furthermore, the relatively deep pintle bearing aperture in the bolt weakens the bolt, particularly in view of the fact that the said pintle bearing aperture necessarily intersects the horizontal bearing aperture for the pivot stud of the extractor. This deep pintle aperture results in distortion during manufacture and occasional breaking during use, particularly when the bolt has various cuts therein to reduce weight. The principal object of the present invention is to provide a bolt mechanism wherein the cam block is held against vertical movement otherwise than by the extractor stud or by any other removable element engaging the stem or pintle of the cam block. With the improved construction the exact relative positioning of the bearing aperture for the extractor stud is less important and there is less weakening of the bolt, and for these and other reasons desirable manufacturing economies are effected and there is a reduced possibility of bolt breakage.

A further object of the invention is to make it possible for the cam block or switch to be more readily removed, it being unnecessary to first remove the extractor.

Other objects of the invention will be apparent from the following specification and claims and from the drawing.

In the drawing there is shown in detail a preferred embodiment of the invention, but it will be understood that various changes may be made from the construction shown, and that the drawing is not to be construed as confining or limiting the scope of the invention, the claims forming a part of this specification being relied upon for that purpose.

Of the drawing.

Fig. 1 is a plan view of the front portion of a bolt mechanism embodying the invention.

Fig. 2 is a view similar to Fig. 1 but showing the movable cam block in a different position.

Fig. 3 is a side view of the front portion of the bolt mechanism as shown in Fig. 2.

Fig. 4 is a view similar to Figs. 1 and 2 but showing the movable cam block in the position which it occupies during assembly and disassembly.

Fig. 5 is a fragmentary sectional view taken along the line 5—5 of Fig. 1.

Fig. 6 is a fragmentary sectional view taken along the line 6—6 of Fig. 2.

Fig. 7 is an end view of the cam block.

Referring to the drawing, 10 represents the longitudinally movable breech bolt as an entirety, only the front portion thereof being shown. The bolt is longitudinally reciprocable in the barrel extension of the gun and is guided therein by means which are the same as or similar to those disclosed in Patent 1,936,254. The bolt 10 has a transverse bearing aperture 12 therein for receiving the pivot stud of the extractor, which is not shown. The extractor is held in place by a flange thereon which enters an arcuate groove 14 formed in the side of the bolt.

The bolt is provided at the top with two pairs of grooves forming parts of two oppositely inclined intersecting cam paths, one of these cam paths being adapted for use in feeding the cartridge belt from left to right, and the other of them being adapted for use in feeding the cartridge belt from right to left. One of the cam paths comprises a pair of aligned grooves 16 and 18 formed in the top of the bolt and the other of the cam paths comprises a pair of aligned grooves 20 and 22 formed in the top of the bolt. At the intersection of the cam paths, that is, between the grooves 16 and 18 and between the grooves 20 and 22, the bolt is provided with a recess 24 which is bounded by arcuate walls 26 and 28 conforming to a cylinder having a vertical axis at 30. The recess 24 is located in part above the transverse bearing aperture 12 for the pivot stud of the extractor. Positioned within the recess 24 is an angularly movable cam block or "switch" 32 which is shaped to fit or approximately fit the walls 26 and 28. The cam block 32 has a groove 34 in the top thereof having the same cross sectional size and shape as the grooves 16, 18, 20 and 22, and the cam block is angularly movable so that the groove 34 can register with the grooves 20 and 22 as shown in Fig. 1 or with the grooves 16 and 18 as shown in Fig. 2. Thus the cam block 32 with its groove 34 serves to complete either of the cam paths so as to adapt the bolt mechanism for feeding from left to right or for feeding from right to left.

A releasable means is provided for holding the cam block in either of the positions last described, and as shown, this means comprises a spring-pressed plunger 36 which can enter a hole 38 in the cam block to hold it in the position shown in Fig. 1, or can enter a hole 40 in the cam block to hold it in the position shown in Fig. 2. When the cam block is to be adjusted from one position to another the plunger 36 is depressed by a suitable tool.

In order to prevent relative upward movement of the cam block while permitting relative angular movement, the recess is provided with undercuts 42 and 44 which are below the said arcuate walls 26 and 28 and which extend radially outward therefrom, and the cam block is provided with integral arcuate flanges 46 and 48 adapted to enter and approximately fit the said undercuts. It will be seen that with the cam block in either of the positions shown in Figs. 1 and 2 the entry of the flanges 46 and 48 in the undercuts 42 and 44 effectually prevents any upward movement of the cam block while leaving it free to move angularly.

In order that the cam block may be engaged with or disengaged from the bolt, the two undercuts 42 and 44 are spaced apart. Preferably, the recess 24 has openings at its sides and the undercuts terminate at the said openings. When the block is moved to the position shown in Fig. 4, the flanges 46 and 48 are free from the undercuts 42 and 44 and are out of vertical register therewith, and the block can be moved downward for assembly or upward for disassembly. The sides of the block 32 may be longitudinally grooved, as shown most clearly in Fig. 7, to facilitate handling during assembly and disassembly. It will be observed that it is not necessary to remove the extractor in order to engage or disengage the block.

Preferably, the block is provided with a bearing aperture 50 which is concentric with the axis 30 and the block 32 is provided with a stem or pintle 52 which enters and closely fits the bearing aperture 50. The pintle bearing aperture 50 is longitudinally spaced from the aperture 12 for the pivot stud of the extractor, and the sides of the bearing aperture are preferably curved inwardly and downwardly as shown. The sides of the pintle 52 are similarly curved inwardly and downwardly and thus the pintle has a large fillet at the top which serves to strengthen the block, which would otherwise be relatively weak by reason of the deep groove 34 therein, as shown in Fig. 7. The pintle may have a central hole 54 therein to admit air to the space below the block, thus facilitating removal thereof. The engagement of the pintle 52 with the bearing aperture 50 serves to center the block and to guide the angular movement thereof, thus making it unnecessary to provide a close fit between the periphery of the block and the periphery of the recess or between the peripheries of the flanges and the peripheries of the undercuts. The fact that close fits are not necessary is shown in exaggerated form in Fig. 5.

The bearing aperture 50 is relatively shallow in order to reduce to a minimum any weakening of the bolt. As shown in Fig. 3, the bottom of the aperture is at a level above the bottom of the said transverse bearing aperture 12. The shallow bearing aperture 50 and the short pintle 52 are effective for guiding angular movement of the cam block by reason of the fact that the flanges 46 and 48 in the undercuts 42 and 44 prevent any upward movement of the block.

It will be seen that with the improved construction as shown and described, the bearing aperture 12 for the extractor stud does not intersect the bearing aperture 50 for the pintle of the cam block, thus avoiding the weakening of the block which is necessarily incident to intersecting apertures. Furthermore, the aperture 12 can be positioned with only such accuracy as is required for proper functioning of the extractor, and no consideration need be given to the exact relationship between the two apertures. It is also evident that the pintle 52 is relatively short and that the aperture 50 for receiving it is relatively shallow, thus additionally avoiding the weakening of the bolt which was incident to a deep aperture such as that shown in Patent No. 1,936,254.

The manner of use of the improved bolt mechanism as shown and described is the same as disclosed in the said Patent 1,936,254 and reference may be had to that patent for a description of the parts of the gun with which the bolt mechanism cooperates and for a description of the functioning of the several parts.

What is claimed is:

1. A bolt mechanism for a machine gun comprising in combination, a longitudinally movable breech bolt provided at the top with a recess partly bounded at its upper portion by longitudinally opposite arcuate walls conforming to a cylinder having a vertical axis which recess has undercuts below the said arcuate walls and extending radially outward therefrom, the said bolt being also provided at the top with four grooves arranged in pairs to form incomplete parts of two oppositely inclined intersecting cam paths with the adjacent ends of the grooves of each pair respectively terminating at and interrupting the said opposite arcuate walls of the recess, a cam block angularly movable in the recess about the said axis and provided at the top with a groove adapted to register with the said grooves of either pair in the top of the bolt to complete either of the said cam paths, the said cam block having opposite arcuate walls approximately fitting the said opposite arcuate walls of the recess and also having opposite integral flanges below the said arcuate walls of the recess and of the cam block and projecting outward into the said undercuts in the recess to prevent upward movement of the cam block while permitting angular movement thereof about the said axis, and releasable means for holding the cam block with the groove in the top thereof in register with the grooves of either pair in the top of the bolt.

2. A bolt mechanism for a machine gun comprising in combination, a longitudinally movable breech bolt provided at the top with a recess partly bounded at its upper portion by longitudinally opposite arcuate walls conforming to a cylinder having a vertical axis which recess has undercuts below the said arcuate walls and extending radially outward therefrom and which recess includes a downward extending shallow bearing aperture concentric with the said axis, the said bolt being also provided at the top with four grooves arranged in pairs to form incomplete parts of two oppositely inclined intersecting cam paths with the adjacent ends of the grooves of each pair respectively terminating at and interrupting the said opposite arcuate walls of the recess, a cam block angularly movable in the recess about the said axis and provided at the top with a groove adapted to register with the said grooves of either pair in the top of the bolt to complete either of the said cam paths, the said cam block having a short integral downward extending pintle fitting the bearing aperture in the recess for guiding angular movement of the block about the said axis and the said cam block having opposite integral flanges below the said arcuate walls of the recess and projecting outward into the said undercuts in the recess to prevent upward movement of the cam block while permitting the said angular movement thereof, and releasable means for holding the cam block with the groove in the top thereof in register with the grooves of either pair in the top of the bolt.

3. A bolt mechanism for a machine gun comprising in combination, a longitudinally movable breech bolt provided at the top with a recess partly bounded at its upper portion by longitudinally opposite arcuate walls conforming to a cylinder having a vertical axis which recess has undercuts below the said arcuate walls and extending radially outward therefrom and which recess includes a downward extending shallow bearing aperture concentric with the said axis and having its side walls curved inwardly and downwardly, the said bolt being also provided at the top with four grooves arranged in pairs to form incomplete parts of two oppositely inclined intersecting cam paths with the adjacent ends of the grooves of each pair respectively terminating at and interrupting the said opposite arcuate walls of the recess, a cam block angularly movable in the recess about the said axis and provided at the top with a groove adapted to register with the said grooves of either pair in the top of the bolt to complete either of the said cam paths, the said cam block having a short integral downward extending pintle fitting the bearing aperture in the recess for guiding angular movement of the block about the said axis and the said cam block having opposite integral flanges below the said arcuate walls of the recess and projecting outward into the said undercuts in the recess to prevent upward movement of the cam block while permitting the said angular movement thereof about the said axis, and releasable means for holding the cam block with the groove in the top thereof in register with the grooves of either pair in the top of the bolt.

4. A bolt mechanism for a machine gun comprising in combination, a longitudinally movable breech bolt having a transverse horizontal bearing aperture for an extractor pivot stud and provided at the top with a recess located in part above the said aperture and partly bounded at its upper portion by longitudinally opposite arcuate walls conforming to a cylinder having a vertical axis which recess has undercuts below the said arcuate walls and extending radially outward therefrom and which recess includes a shallow downward extending bearing aperture concentric with the said axis and longitudinally spaced from the said transverse bearing aperture, the said bolt being also provided at the top with four grooves arranged in pairs to form incomplete parts of two oppositely inclined intersecting cam paths with the adjacent ends of the grooves of each pair respectively terminating at and interrupting the said opposite arcuate walls of the recess, a cam block angularly movable in the recess about the said axis and provided at the top with a groove adapted to register with the said grooves of either pair in the top of the bolt to complete either of the said cam paths, the said cam block having a short integral downward extending pintle fitting the bearing aperture in the recess for guiding angular movement of the block about the said axis and the said cam block having opposite arcuate walls approximately fitting the said opposite arcuate walls of the recess and also having integral flanges below the said arcuate walls of the recess and of the cam block and projecting outward into the said undercuts in the recess to prevent upward movement of the cam block while permitting the said angular movement thereof, and releasable means for holding the cam block with the groove in the top thereof in register with the grooves of either pair in the top of the bolt.

5. A bolt mechanism for a machine gun comprising in combination, a longitudinally movable breech bolt provided at the top with a recess having openings at its sides and bounded at its upper portion between the said openings by longitudinally opposite arcuate walls conforming to a cylinder having a vertical axis which recess has undercuts below the said arcuate walls and extending radially outward therefrom, the said bolt being also provided at the top with four grooves arranged in pairs to form incomplete parts of two oppositely inclined intersecting cam paths with the adjacent ends of the grooves of each pair respectively terminating at and interrupting the said opposite arcuate walls of the recess, a cam block angularly movable in the recess about the said axis and provided at the top with a groove adapted to register with the said grooves of either pair in the top of the bolt to complete either of the said cam paths, the said cam block having arcuate walls at its said ends approximately fitting the said opposite arcuate walls of the recess and also having integral flanges at its ends below the said arcuate walls of the recess and of the cam block and projecting outward into the said undercuts in the recess to prevent upward movement of the cam block while permitting angular movement thereof and the said cam block being narrower at its ends than the respective openings in the sides of the recess so that it is engageable with or separable from the bolt by relative vertical movement when the ends of the block are in register respectively with the said openings, and releasable means for holding the cam block with the groove in the top thereof in register with the grooves of either pair in the top of the bolt.

E. WARREN HEDGES,

*Administrator of the Estate of Ellsworth C. Hedges, Deceased.*

REFERENCES CITED

The following references are of record in the file of this patent:

UNITED STATES PATENTS

| Number | Name | Date |
|---|---|---|
| Re. 19,159 | Moore et al. | May 8, 1934 |
| 1,369,646 | Fuller | Feb. 22, 1921 |
| 1,534,131 | McBride | Apr. 21, 1925 |
| 1,596,367 | Miller | Aug. 17, 1926 |
| 1,803,351 | Moore et al | May 5, 1931 |
| 1,920,984 | Howard | Aug. 8, 1933 |
| 1,936,254 | Moore et al. | Nov. 21, 1933 |
| 1,956,574 | Hatcher | May 1, 1934 |